(12) United States Patent
Ouweltjes et al.

(10) Patent No.: US 11,054,244 B2
(45) Date of Patent: Jul. 6, 2021

(54) METHOD OF SUPPRESSING FALSE POSITIVE SIGNALS DURING SELF MIXING INTERFERENCE PARTICLE DETECTION

(71) Applicant: TRUMPF Photonic Components GmbH, Ulm (DE)

(72) Inventors: Okke Ouweltjes, Ulm (DE); Johannes Hendrikus Maria Spruit, Ulm (DE); Alexander Marc van der Lee, Ulm (DE); Petrus Theodorus Jutte, Ulm (DE)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 93 days.

(21) Appl. No.: 16/680,563

(22) Filed: Nov. 12, 2019

(65) Prior Publication Data

US 2020/0096314 A1    Mar. 26, 2020

Related U.S. Application Data

(63) Continuation of application No. PCT/EP2018/061638, filed on May 7, 2018.

(30) Foreign Application Priority Data

May 12, 2017   (EP) .................................. 17170761

(51) Int. Cl.
*G01B 9/02* (2006.01)
*G01N 15/02* (2006.01)
(Continued)

(52) U.S. Cl.
CPC ...... *G01B 9/02092* (2013.01); *G01N 15/0227* (2013.01); *G01N 15/1429* (2013.01);
(Continued)

(58) Field of Classification Search
CPC .. G01B 9/02092; G01B 9/02; G01N 15/0227; G01N 15/1429; G01N 15/1434; G01N 2015/1454; G01N 15/02; G01S 7/4916
(Continued)

(56) References Cited

U.S. PATENT DOCUMENTS

| 6,233,045 B1 * | 5/2001 | Suni .......................... G01C 3/08 356/28.5 |
| 7,656,526 B1 * | 2/2010 | Spuler .................. G01N 21/538 356/336 |

(Continued)

FOREIGN PATENT DOCUMENTS

| WO | WO 0237410 A1 | 5/2002 |
| WO | 102015207289 A1 | 10/2016 |

(Continued)

OTHER PUBLICATIONS

Guido Giuliani, et al., "Laser Diode Self-mixing Technique for Sensing Applications", Journal of Optics A: Pure and Applied Optics, Nov. 4, 2002, pp. 283-294.
(Continued)

*Primary Examiner* — Roy M Punnoose
(74) *Attorney, Agent, or Firm* — Leydig, Voit & Mayer, Ltd.

(57) ABSTRACT

A method of measuring a particle density of particles includes emitting, by a laser, a laser beam directed to a mirror, redirecting the laser beam by the mirror with a predetermined periodic movement, and focusing the laser beam to a detection volume by an optical imaging device. The method further includes determining a self mixing interference signal of an optical wave within a laser cavity if the self mixing interference signal is generated by laser light of the laser beam reflected by at least one of the particles and suppressing a false self mixing interference signal for particle detection if the self mixing interference
(Continued)

signal is caused by a disturbance in an optical path of the laser beam. The false self mixing signal caused by the disturbance in the optical path of the laser beam is suppressed in a defined range of angles of the mirror during the periodic movement.

17 Claims, 7 Drawing Sheets

(51) Int. Cl.
    *G01N 15/14*      (2006.01)
    *G01S 7/4912*      (2020.01)

(52) U.S. Cl.
    CPC ........ *G01N 15/1434* (2013.01); *G01S 7/4916* (2013.01); *G01N 2015/1454* (2013.01)

(58) Field of Classification Search
    USPC .......................................................... 356/450
    See application file for complete search history.

(56) References Cited

U.S. PATENT DOCUMENTS

| | | | |
|---|---|---|---|
| 9,857,287 B2* | 1/2018 | Dittrich | G01N 15/0205 |
| 2007/0206180 A1 | 9/2007 | Liess | |
| 2012/0002189 A1* | 1/2012 | Bengoechea Apezteguia | G01S 17/58 356/28.5 |
| 2016/0238510 A1* | 8/2016 | Bachalo | G01N 15/1434 |
| 2016/0313243 A1 | 10/2016 | Dittrich et al. | |

FOREIGN PATENT DOCUMENTS

| | | |
|---|---|---|
| WO | WO 2017016888 A1 | 2/2017 |
| WO | WO 2017017282 A1 | 2/2017 |

OTHER PUBLICATIONS

Usman Zabit, et al., "Self-Mixing Laser Sensor for Large Displacements: Signal Recovery in the Presence of Speckle", IEEE Sensors Journal, vol. 13, No. 2. Feb. 2013, pp. 824-831.

* cited by examiner

METHOD OF SUPPRESSING FALSE POSITIVE SIGNALS DURING SELF MIXING INTERFERENCE PARTICLE DETECTION

CROSS REFERENCE TO RELATED APPLICATIONS

This application is a continuation of International Application No. PCT/EP2018/061638 (WO 2018/206474 A1), filed on May 7, 2018, and claims benefit to European Patent Application No. EP17170761.5, filed on May 12, 2017.

FIELD

The invention relates to a laser sensor module, a particle detector comprising such a laser sensor module, and devices, especially mobile communication devices, comprising such a laser sensor module or particle detector. The invention further relates to a method of measuring a particle density of small particles. The invention finally relates to a corresponding computer program product.

BACKGROUND

DE 10 2015 207 289 A1 discloses a particle sensor apparatus having an optical emitter device that is configured to emit an optical radiation so that a volume having at least one particle possibly present therein is at least partly illuminable; an optical detector device having at least one detection surface that is struck by at least a portion of the optical radiation scattered at the at least one particle, at least one information signal regarding an intensity and/or an intensity distribution of the optical radiation striking the at least one detection surface being displayable; and an evaluation device with which an information item regarding a presence of particles, a number of particles, a particle density, and/or at least one property of particles is identifiable and displayable, the particle sensor apparatus also encompassing at least one lens element that is disposed so that the emitted optical radiation is focusable onto a focus region inside the volume.

WO 2017/016888 A1 discloses a laser sensor module for particle density detection based on self mixing interference measurements.

SUMMARY

In an embodiment, the present invention provides a method of measuring a particle density of particles. The method includes emitting, by a laser, a laser beam directed to a mirror, redirecting the laser beam by the mirror with a predetermined periodic movement, and focusing the laser beam to a detection volume by an optical imaging device. The method further includes determining a self mixing interference signal of an optical wave within a laser cavity of the laser if the self mixing interference signal is generated by laser light of the laser beam reflected by at least one of the particles and suppressing a false self mixing interference signal for particle detection if the self mixing interference signal is caused by a disturbance in an optical path of the laser beam. The false self mixing signal caused by the disturbance in the optical path of the laser beam is suppressed in a defined range of angles of the mirror during the periodic movement.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention provides laser sensor modules with improved detection accuracy and/or improved sensitivity.

According to a first aspect, a method of measuring a particle density of particles with a size of less than 20 μm, preferably less than 10 μm, in a fluid is presented. The method includes emitting a laser beam to a mirror, dynamically redirecting the laser beam by the mirror with a predetermined periodic movement, imaging the laser beam to a detection volume, by an optical imaging device, allowing determination of a self mixing interference signal of an optical wave within a laser cavity of the laser if the self mixing interference signal is generated by laser light of the laser beam reflected by at least one of the particles, and suppressing a false self mixing interference signal for particle detection if the self mixing interference signal is caused by a disturbance in an optical path of the laser beam.

When a laser beam is scanned through a cover glass or through an optical imaging device, reflections back into the laser may give rise to false positive signals. This false positive signal will result in false positives for the particle detection. The optical imaging device may, for example, comprise a cover glass for protection purposes and one or more additional optical elements (lenses and the like). Due to the round shape of, for example, a lens light may be reflected back into the laser cavity after applying a lens tilt. Furthermore, small irregularities of the surfaces of optical elements within the optical path as well as dirt particles (e.g. on the cover glass) may cause such false positive signals.

A disturbance in the optical path of the laser beam comprises all interactions of laser light emitted by the laser with an element of the optical imaging device or disturbances on one of the surfaces of such an element causing direct reflection of laser light back in the laser cavity. Direct reflection can mean, in this respect that the laser light is reflected back to the laser cavity without leaving the optical imaging device (includes the outer surface of the optical imaging device). Suppressing the false self mixing interference signal for particle detection caused by a disturbance can mean: avoiding the generation of such false or disturbing self mixing interference signal as well as determining the false or disturbing self mixing interference signal but discarding this false or disturbing self mixing interference signal for determination of the particle density.

Certain technical measures which are suitable to suppress determination of false or disturbing self mixing interference signal caused by a first kind of disturbance may not be suited to suppress determination of false or disturbing self mixing interference signals caused by a second different kind of disturbance as will be explained in more detail below.

The suppression of the false self mixing interference signal may, for example, be based on the periodic movement of the mirror.

Shape, duration or in general the characteristic or even existence of the disturbing self mixing interference signal may be related to the periodic movement of the mirror. Suppression of such disturbing self mixing interference signals may therefore be based on the periodic movement of the mirror because filter characteristics for filtering such disturbing self mixing interference signals are adapted in accordance with the periodic movement.

The disturbing self mixing interference signal may, for example, be caused by an interaction of an optical element of the optical imaging device in a defined time period during the periodic movement of the mirror. The mirror may, for example, oscillate with a frequency of 400 Hz. The unintended reflection caused by the interaction may be related to the arrangement of the respective optical element, an unintended local irregularity or a local contamination (e.g. fingerprint on the cover glass) of the respective optical element. The reflection happens in this case two times during a full period of the periodic movement of the mirror. A master clock may, for example, be used to determine the periodic movement and evaluation of the detected self mixing interference signals. No self mixing interference signal may therefore be determined during a defined time period of the periodic movement or, for example, all detected self mixing interference signals during such a time period may be discarded. The defined time period may be fixed (e.g. determined in the factory or by the calibration procedure) and/or adapted depending on an analysis of detected self mixing interference signals (for example in case of a most likely timely limited contamination of a surface).

Disturbing periodic self mixing interference signals may alternatively or in addition be detected and compensated by using an adaptive filter in a configuration called an Adaptive Line Enhancer or ALE. The ALE has the capability of separating periodic and stochastic components in a signal. The filter is self-tuning and is configured such that it slowly adapts to periodic self mixing interference signals such as the recurring down-up-chirp self mixing interference signals caused by the internal reflection on an optical element (e.g. lens). The chirp-like self mixing interference signals will be nearly cancelled by the ALE from the particle self mixing interference signal, leaving a clean particle signal. If tuned correctly, it can also compensate for phase shifts due to slow temperature changes. A disadvantage may be that such a configuration requires long filters. Given a sample rate of $f_s=40$ MHz, and a mirror frequency of $f_m=400$ Hz, the ALE filter length must equal that of one period of the mirror and thus requires a FIR filter length of 100000 samples. This is processing intensive, and for a practical implementation it might only be feasible to realize it using a Partitioned Frequency Domain Adaptive Filters (PFDAF) structure. The PFDAF can be simplified if it is combined with the frequency domain particle processing unit. Alternatively or in addition, Fast Fourier transformation (FFT) may be used to enable or support a reliable suppression of disturbing self mixing interference signals.

The method may further include suppressing the false self mixing signal caused by the disturbance in the optical path based on a first frequency range of the self mixing interference signal generated by laser light of the laser beam reflected by particles.

Self mixing interference signals which are caused by particle reflections may depending on the characteristics of the particles be characterized by certain frequency ranges. Self mixing interference signals which are detected and which are out of these frequency ranges may therefore be discarded. Any kind of digital or analogue filter may be used in order to suppress particle counts based on self mixing interference signals outside these frequency ranges.

Determination of the false self mixing signal caused by the disturbance in the optical path may be suppressed in a defined range of angles of the mirror during the periodic movement. The defined range of angles of the mirror may, for example, be determined by the clock synchronized with the oscillation of the mirror. Alternatively or in addition, no self mixing interference signal may be determined or be taken into account if the mirror is detected in the defined range of angles.

The defined range of angles may be determined based on a characteristic of the self mixing interference signal determined during the periodic movement of the mirror. Monitoring characteristics of the self mixing interference signal like, for example, frequency (see discussion above), amplitude and the like may enable an adaptive suppression of disturbing self mixing interference signals.

The characteristic of the self mixing interference signal may, for example, be given by a frequency characteristic.

The frequency characteristic of the self mixing interference signal may, for example, be a high-frequency and low-amplitude signal at the beginning, followed by a lower-frequency and higher amplitude in between and a high-frequency and low amplitude signal at the end, wherein the defined range of angles is determined by the beginning and the end of the self mixing interference signal. The time or position of the mirror at the beginning as well as at the end of the frequency determines the defined range of angles.

Experiments have shown that such frequency characteristics can be observed in case of unintended reflections of laser light of the laser beam at a surface of the optical imaging device.

Determination of the false self mixing signal caused by the disturbance in the optical path may be suppressed if the self mixing interference signal exceeds a defined threshold duration.

The duration of self mixing interference signals which are generated by particle reflection depend on the particle size, the beam velocity and the distance between the mirror and the particle. An upper limit of the size of the particles which are intended to be detected for determination of the particle density may therefore define an upper limit of the duration of the self mixing interference signal. Self mixing interference signals with duration longer than the defined threshold duration may therefore be discarded. The defined threshold duration may be predefined or be determined during a self learning process (e.g. by a reference particle size or particle density).

Alternatively or in addition, the false self mixing signal caused by the disturbance in the optical path may be suppressed based on a signal strength of the self mixing interference signal generated by laser light of the laser beam reflected by particles. Signal strength or signal amplitude of a self mixing interference signal caused by particle reflection may depend on particle size and characteristics of the particle surface. There may therefore be an upper limit of the signal strength or signal amplitude resulting from particle reflection. Self mixing interference signals with a signal strength or signal amplitude above this upper limit may therefore be discarded.

The false self mixing signal caused by the disturbance in the optical path may alternatively or in addition be suppressed by determining a background noise for a discrete number of time segments within one period of the periodic movement of the mirror and adapting a detection threshold based on the background noise of the respective time segment for the respective time segment.

A particle detection algorithm may be based on a Short Term Fourier Transform (STFT). The signal is partitioned into small (optionally half overlapping) blocks from which the power spectral density (PSD) is determined. A particle is detected if the amplitude of one or more frequency bins in the PSD of a single frame exceeds a certain detection threshold. This detection algorithm works well as long as the self mixing interference signal is clean and signals due to the internal e.g. lens reflections are absent.

Given a sample rate of fs=40 MHz, and a mirror frequency of fm=400 Hz, the reflection signals cover a period of 100000 samples. When the STFT has a non-overlapping frame size of B=16, then there are 6250 frames in one mirror period. During this mirror period the reflection signal is chirped from a high frequency to low frequency and back. For each specific frame in one mirror period the reflection signal generates a specific 'signature', in this case 6250 in total.

To estimate the specific signature for each frame within one mirror period, the following subsampling method may be used: If there are N mirror periods, where each period contains K frames (K=6250 in this example) indicating a single frame with k, the 'signature' may be determined by averaging the kth frame over N periods. The signature can be used to further process the frames. It can be used to simply adapt the detection threshold per frame and even per frequency within that particular frame. The averaging may alternatively be performed in the complex domain. The averaging may in this case be used to subtract a background from the frame.

The background noise may be determined after fabrication of a laser sensor module adapted to perform the method (see below). Signals caused by reflection at the optical imaging device can be suppressed.

Alternatively it may be possible to perform calibration runs to determine the background noise. The calibration run may comprise several periods of mirror movement such that for each time segment a selection of the measurement result can be performed in order to determine the background noise (not taking into account strong signals which may be caused by a particle detection in this respective time segment).

The detection threshold for the respective time period may comprise a respective frequency range.

According to a second aspect, a laser sensor module for measuring a particle density of particles with a size of less than 20 µm, preferably less than 10 µm, in a fluid is provided. The laser sensor module includes a laser arranged to emit a laser beam to a mirror. The mirror is arranged to move periodically to dynamically redirect the laser beam. The laser sensor module further comprises an optical imaging device which is arranged to image the laser beam to a detection volume. The laser sensor module is arranged to allow determination of a self mixing interference signal of an optical wave within a laser cavity of the laser if the self mixing interference signal generated by laser light of the laser beam reflected by at least one of the particles. The laser sensor module is further arranged to suppress the false self mixing interference signal for particle detection if the self mixing interference signal is caused by a disturbance in an optical path of the laser beam.

The laser sensor module may include, for example, a frequency filter for suppressing disturbing self mixing interference signals. Alternatively or in addition the laser sensor module may include an evaluator which is arranged to perform the method steps described above.

According to a further aspect, a particle detector is provided. The particle detector includes a laser sensor module according to any one of the embodiments described above. The particle detector may include the evaluator. The particle detector may further include an interface (e.g. optical or acoustical) for presenting the measured particle density.

A device like an air purifier, an exhaust hood, a car, a sensor box or a wearable device like a mobile communication device and the like may, for example, include the laser sensor module or particle detector according to any embodiment described above.

According to a further aspect, a computer program product is presented. The computer program product includes computer executable instructions which can be saved on at least one memory device of the laser sensor module described above or on at least one memory device of a device comprising the laser sensor module described above. The computer executable instructions being arranged such that the method described above can be executed by at least one processing device of the laser sensor module described above or by at least one processing device of the device comprising the laser sensor module described above.

The memory device or the processing device may be comprised by the particle detector (e.g. electrical driver, evaluator etc.) or the device comprising the particle detector. A first memory device and/or first processing device of the device including the particle detector may interact with a second memory device and/or second processing device comprised by the particle detector or laser sensor module.

The memory device or devices may be any physical device being arranged to store information especially digital information. The memory device may be especially selected out of the group solid-state memory or optical memory.

The processing device or devices may be any physical device being arranged to perform data processing, especially processing of digital data. The processing device may be especially be any one of a processor, a microprocessor, or an application-specific integrated circuit (ASIC).

It Various embodiments of the invention will now be described by way of the Figures. In the Figures, like numbers refer to like elements throughout. Elements in the Figures are not necessarily drawn to scale.

Self-mixing interference is used for detecting movement of and distance to an object. Background information about self-mixing interference is described in "Laser diode self-mixing technique for sensing applications", Giuliani, G.; Norgia, M.; Donati, S. & Bosch, T., Laser diode self-mixing technique for sensing applications, Journal of Optics A: Pure and Applied Optics, 2002, 4, S. 283-S. 294 which is incorporated by reference. Detection of movement of a fingertip relative to a sensor in an optical input device is described in detail in International Patent Application No. WO 02/37410 which is incorporated by reference. The principle of self-mixing interference is discussed based on the examples presented in International Patent Application No. WO 02/37410.

A diode laser having a laser cavity is provided for emitting a laser, or measuring, beam. At its upper side, the device is provided with a transparent window across which an object, for example a human finger, is moved. A lens is arranged between the diode laser and the window. This lens focuses the laser beam at or near the upper side of the transparent window. If an object is present at this position, it scatters the measuring beam. A part of the radiation of the measuring beam is scattered in the direction of the illumination beam and this part is converged by the lens on the emitting surface of the laser diode and re-enters the cavity of this laser. The radiation re-entering the cavity of the diode laser induces a variation in the gain of the laser and thus in the intensity of radiation emitted by the laser, and it is this phenomenon which is termed the self-mixing effect in a diode laser.

The change in intensity of the radiation emitted by the laser or of the optical wave in the laser cavity can be detected by a photo diode or a detector arranged to determine an impedance variation across the laser cavity. The diode or impedance detector converts the radiation variation into an electric signal, and electronic circuitry is provided for processing this electric signal.

The self-mixing interference signal may in case of particle detection, for example, be characterized by a short signal burst or a number of signal bursts. The Doppler frequency as observed in these signals is a measure for the particle velocity along the optical axis. It may therefore be preferred to use a DC drive current in order to simplify signal detection and signal analysis. A modulated drive current may be used in order to determine the position or velocity of the particle, for example, by self-mixing interference signals which may be generated by reflection of laser light at bigger particles or disturbing objects. The distance (and optionally velocity) may be determined within one measurement or in a subsequent measurement step. It may therefore be possible or even beneficial to use a DC drive current in a first period in time in order to generate a measurement signal related to the intended particle number, velocity and a modulated drive current in a second time period in order to determine false objects in the beam. The duration and the intensity of the measurement signal may optionally be used to determine the particle size.

Figure 1:
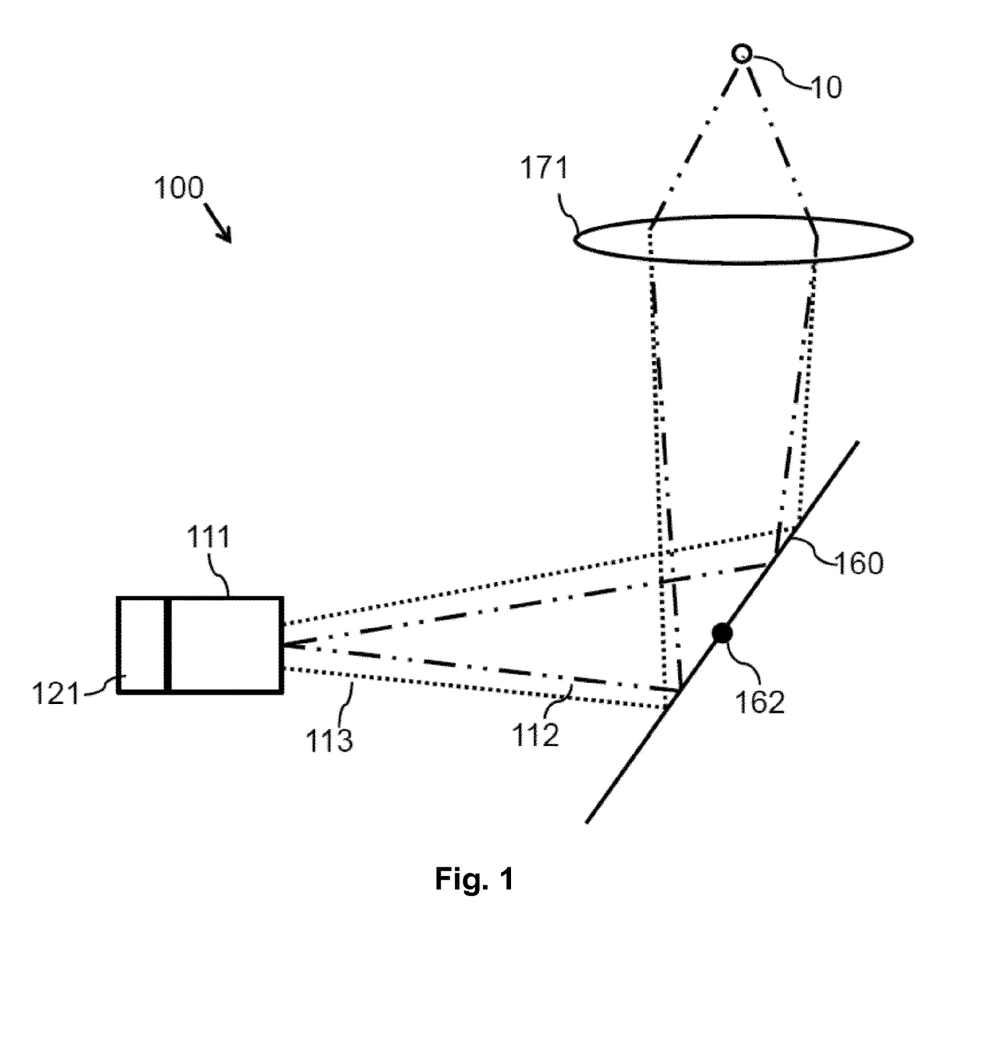
FIG. 1 shows a schematic of a first embodiment of a laser sensor module.

FIG. 1 shows a first embodiment of a laser sensor module 100. The laser sensor module 100 comprises a laser 111 with detector 121 which is in this embodiment an integrated photodiode. The laser sensor module 100 further comprises a mirror 160 which is arranged to move around a rotation axis 162. The movement of the mirror 160 around the rotation axis 162 can be controlled by control signals controlling a driving arrangement (e.g. electrical motor which is not shown) which may be provided via an interface (not shown). The laser 111 emits laser beam 112 such that the laser beam 112 hits mirror 160. The laser beam 112 is redirected by mirror 160 depending on deflection angle of the mirror. The redirected laser beam is imaged by optical imaging device 171 to a detection volume. The optical imaging device 171 is in this case a lens arranged to focus the redirected laser beam to the detection volume with particle 10. A part of the redirected laser light is unintentionally reflected by a surface of the lens such that disturbing laser light 113 reflected by the optical imaging device 171 is reflected back by mirror 160 in the direction of the laser 111. The rotation angle or redirection angle of the mirror 160 is in this case such the disturbing laser light 113 does hit the laser 111. The mirror 160 and rotation axis 162 as well as the relative position of the mirror 160 with respect to the laser 111 and the optical imaging device 171 may alternatively be arranged such that essentially no laser light reflected by one of the surfaces of the lens hit the laser 111. The part of disturbing laser light 113 resulting from a reflection by one of the surfaces of the lens may, for example, be redirected out of the plane of FIG. 1 (paper plane) by a tilt of the lens with respect to the plane of FIG. 1 (optical axis of the lens not parallel to the plane of FIG. 1). The laser sensor module 100 may comprise optical absorbers (not shown) which are arranged to absorb the disturbing laser light 113 which does not hit the laser 111 in order to avoid e.g. unintended secondary reflection. The imaged laser beam hits a particle 10 in the detection volume and a part of the laser light is reflected via the optical imaging device 171 and mirror 160 back to a laser cavity of the laser 111. The self mixing interference within the laser cavity causes a variation of the optical wave within the laser cavity. The measurement signal corresponding to the self mixing interference in the laser cavity is detected by the integrated photo diode and can be exchanged with an external device via an interface. The interface may optionally be used to supply electrical power to the laser sensor module 100. Alternatively, a separate interface to supply electrical power may be provided. Furthermore, there may be separate interfaces in order to exchange control signals for the mirror 160 and to transfer measurement signals related to detect self mixing interference signals instead of the single interface. False or disturbing self mixing interference signals are suppressed by a frequency filter in the detector 121.

Figure 2:
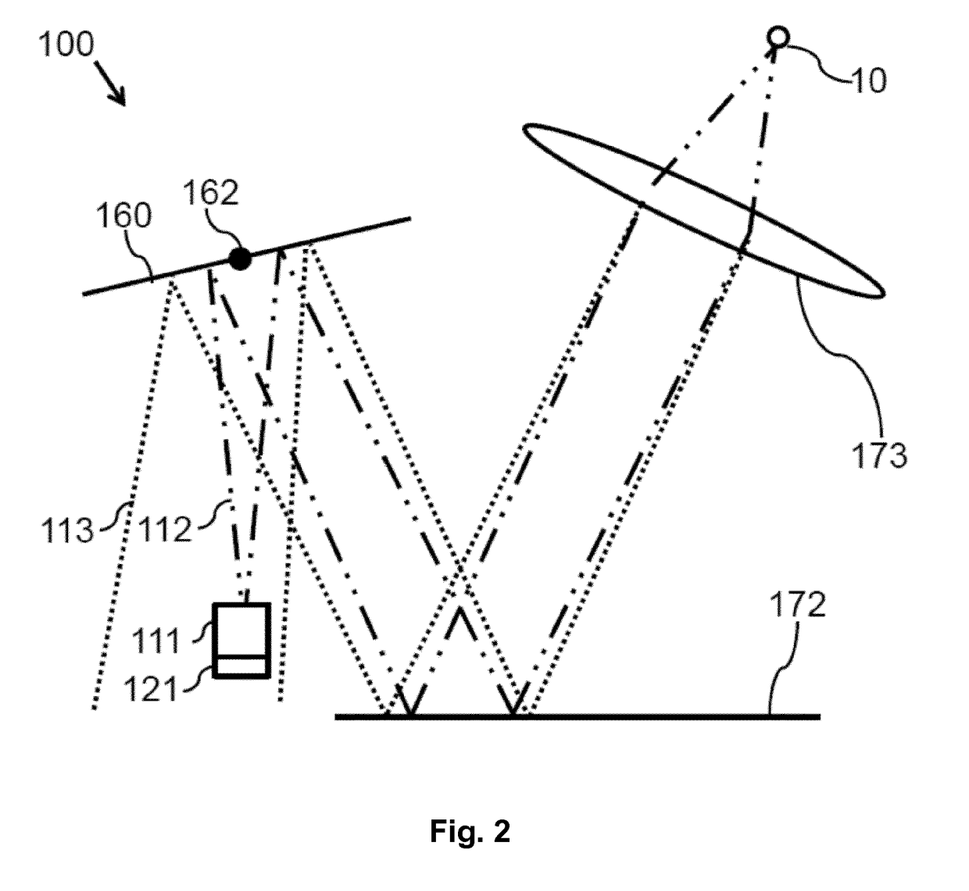
FIG. 2 shows a schematic of a second embodiment of the laser sensor module.

FIG. 2 shows a schematic of a second embodiment of the laser sensor module 100. The laser sensor module 100 is arranged to provide a folded optical path of the laser beam 112. The laser 111 emits the laser beam 112 in the direction of mirror 160 which is movable around the rotation axis 162. The laser beam 112 is reflected by movable mirror 162 to an optical imaging device comprising a reflector 172 and a lens 173. The laser beam 112 is reflected by reflector 172 to lens 173 which is arranged to focus the laser beam 173 to a focus region (detection volume) in order to detect the particle 10. A part of the laser light of the laser beam 112 may be reflected at one or both surfaces of the lens 173 such that laser light 113 reflected by the optical imaging device is reflected back via reflector 172 and mirror 160 to the laser 111 such that a disturbing self mixing interference signal is generated in a laser cavity of the laser 111 which is detected by the detector 121. It is nearly impossible in such a folded configuration enabling a laser sensor module 100 with a low building height to avoid that unintended reflections at surfaces of the optical imaging device reaching the laser cavity. The situation becomes even worse if a cover surface (window) is polluted (e.g. dirt particle, fingerprint etc.). The cover surface is in this embodiment the outer surface of the lens in the direction of the particle 10. The laser sensor module 100 comprises in this case an evaluator (not shown) to suppress self mixing interference signals generated by unintended reflection of laser light.

Figure 3:
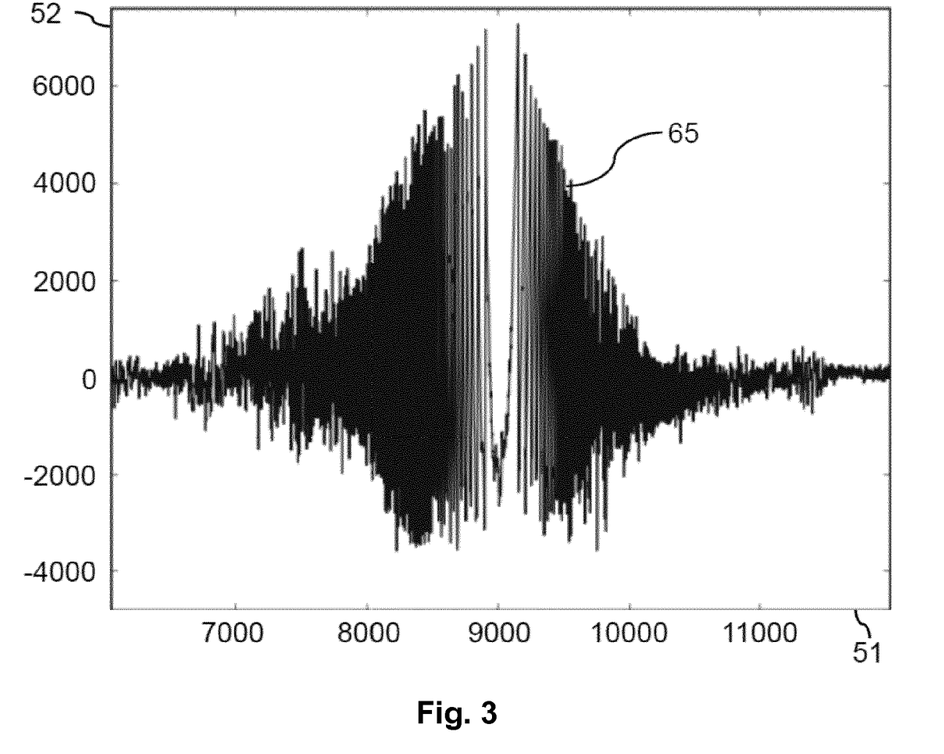
FIG. 3 shows a characteristic of a disturbing self mixing interference signal.

FIG. 3 shows a characteristic of a disturbing self mixing interference signal 65. The abscissa shows the time 51 in microseconds. The ordinate shows the amplitude 52 of the self mixing interference signal in arbitrary units. The disturbing self mixing interference signal 65 is characterized at the beginning (left side) by high-frequency and low amplitude followed by high amplitude and lower frequency in the center and again high-frequency and low amplitude at the end (right side). Such a frequency characteristic may, for example, result from laser light specularly reflected on a cover glass. The phase varies during scanning of the laser beam 112 by mirror 160, resulting in a sinusoidal variation of the self mixing interference signal with varying frequency. The characteristic of the disturbing self mixing interference signal 65 can be used to suppress (e.g. filtering) such signals as described above.

Figure 4:
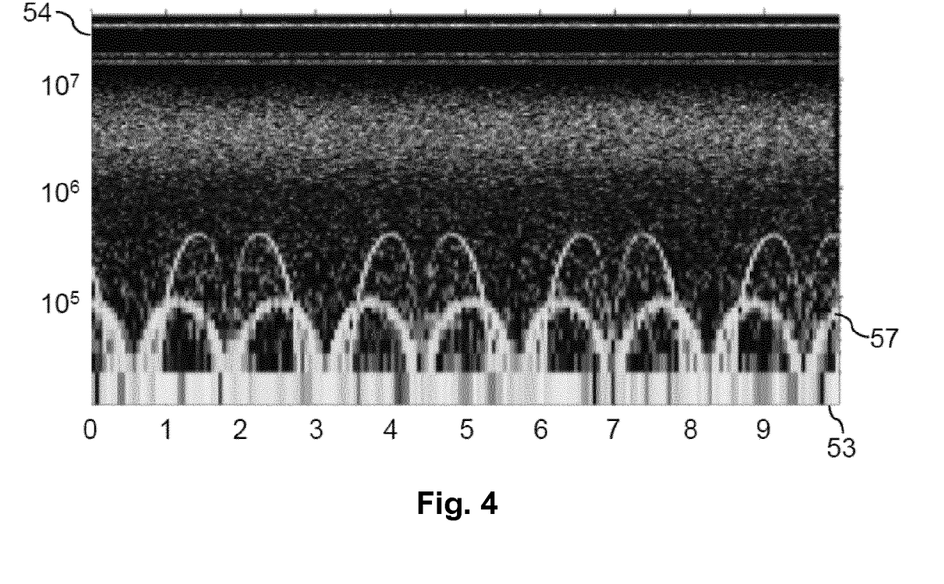
FIG. 4 shows a measured characteristic of a disturbing frequency signal.

FIG. 4 shows a characteristic of another disturbing frequency signal 57. The abscissa shows the time 53 in milliseconds. The ordinate shows the frequency 54 of the self mixing interference signal in Hertz. The periodic disturbances are indicated by the bright arch like signals which correspond to the mirror period of 2.5 ms. The disturbing self mixing interference signals are most likely caused by imperfections of one of the optical elements of the optical imaging device 171, resulting in stray light coming back to the laser 111. The imperfection may, for example, be caused by dirt particles on one of the surfaces. The characteristic of this periodic disturbing self mixing interference signal may be detected by an accordingly adapted evaluator (see below) and suppressed (e.g. filtered) as described above.

Figure 5:
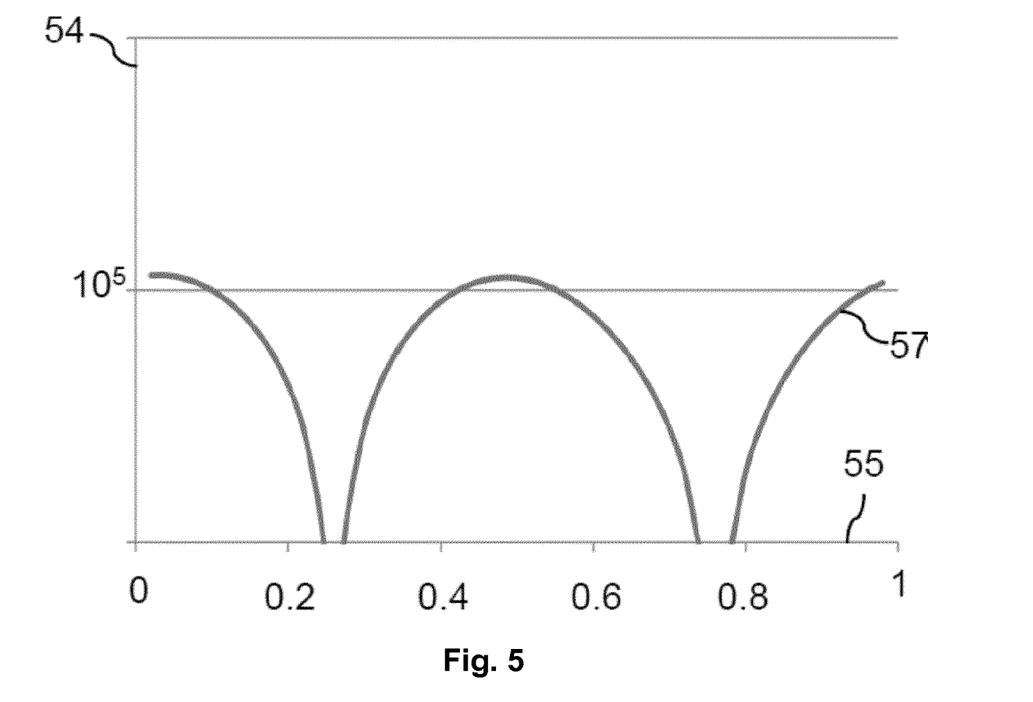
FIG. 5 shows a simulated characteristic of the disturbing frequency signal shown in FIG. 4.

FIG. 5 shows a simulated characteristic of one period of the disturbing frequency signals 57 shown in and discussed with respect to FIG. 4. The abscissa shows one period of mirror oscillation 55 in milliseconds. The ordinate shows again the frequency 54 of the self mixing interference signal in Hertz.

Figure 6:
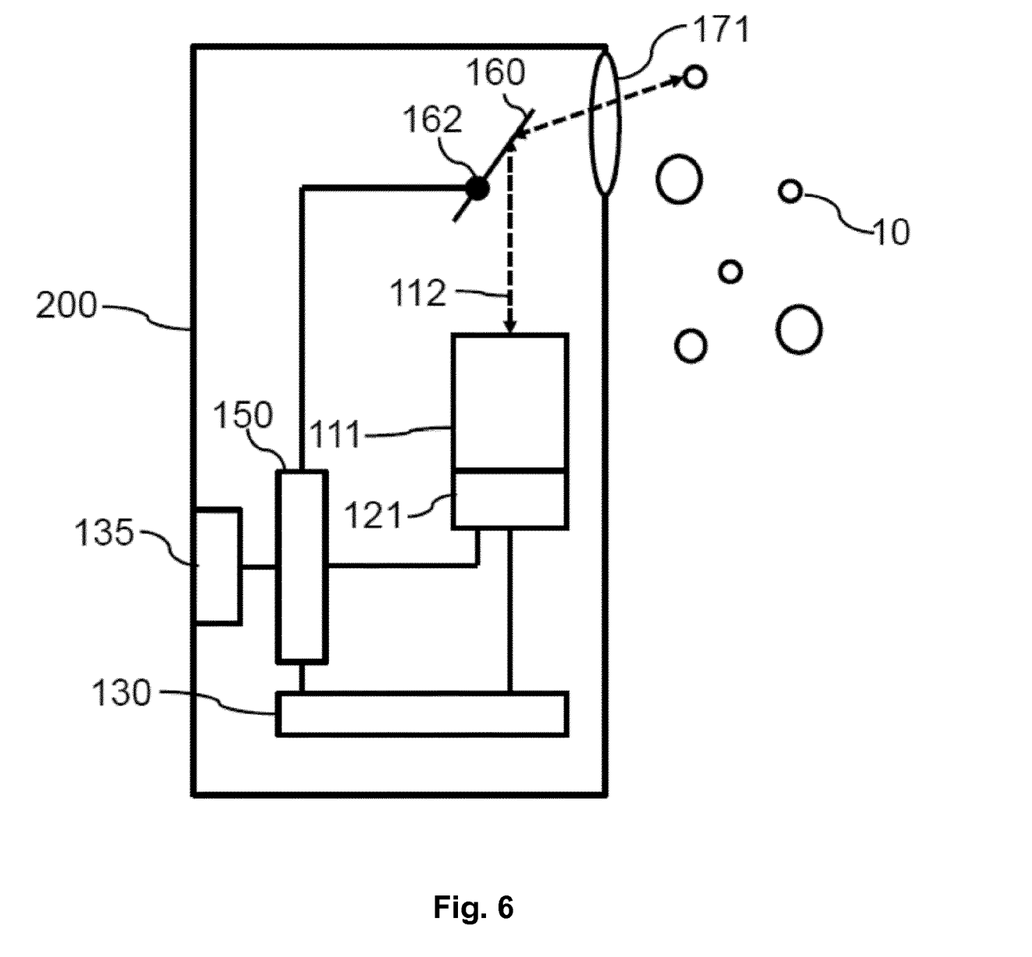
FIG. 6 shows a schematic of a particle detector.

FIG. 6 shows an embodiment of a particle detector 200. The particle detector 200 comprises a laser sensor module 100 which is similar to the laser sensor module 100 discussed with respect to FIG. 1. The particle detector 200 comprises an electrical driver 130 for driving the laser 111 and a controller 150 which is arranged to provide control signals to mirror 160. The controller 150 is further arranged to receive measurement signals detected based on self mixing interference signals in the laser cavity of the laser 111 which are caused by particles 10 detected by detector 121 as discussed above. The controller 150 further comprises an evaluator which is arranged to allow determination of a self mixing interference signal of an optical wave within a laser cavity of the laser 111 if the self mixing interference signal is generated by laser light of the laser beam 112 reflected by at least one of the particles. The evaluator is further arranged to suppress determination of false self mixing interference signal if the self mixing interference signal is caused by a disturbance in an optical path of the laser beam 112. The evaluator comprises in this embodiment an adaptive filter which is arranged to filter self mixing interference signals which are caused by laser light 113 which is back reflected to the laser cavity of the laser 111 by an element of the optical imaging device 171 as discussed with respect to FIG. 1-4. The evaluator may additionally be coupled to a clock (not shown) determining the oscillation frequency of the mirror 160. Disturbing self mixing interference signals may in this case vary with position of the mirror 160 as shown in table 1.

TABLE 1

| Mirror angle (°) | Optical path laser to laser (mm) | Optical path difference (λ) | time (us) | Frequency (MHz) |
| --- | --- | --- | --- | --- |
| 0 | 38.793 | 0 | 31.8 | 0 |
| 1.2 | 38.781 | 14 | 31.9 | 0.44 |
| 2.4 | 38.741 | 61 | 32.3 | 1.89 |
| 3.6 | 38.667 | 148 | 32.8 | 4.51 |
| −1.2 | 38.777 | 19 | 31.9 | 0.59 |
| −2.4 | 38.731 | 73 | 32.3 | 2.26 |
| −3.6 | 38.653 | 165 | 32.8 | 5.03 |

Table 1 provides the frequency of the disturbing self mixing interference signal as a function of a position of the mirror 160 in degrees. The frequency is given by the optical path length variation over time for the specific mirror angle.

Table 1 shows that there is a clear relation between mirror positon and the frequency of the disturbing self mixing interference signal. The evaluator is arranged to determine such a characteristic and to perform a Fast Fourier transformation (FFT). The evaluator is further arranged to discard the bin related to the disturbing self mixing interference signal after FFT. On all other bins particle detection can still be performed. The evaluator is therefore arranged to optimize detection of particle density. Furthermore, in case of contamination of the cover glass or lens specific frequency contributions (see FIG. 3 and FIG. 4) may be present, which can be suppressed after a dynamic adaption process once they are detected.

Figure 7:
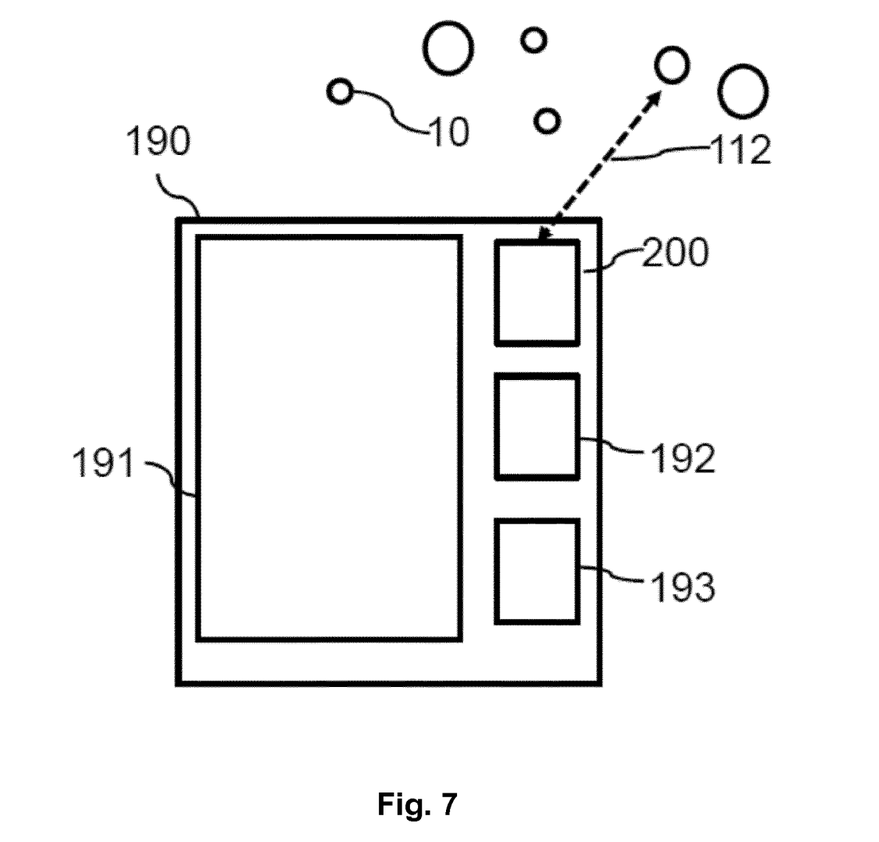
FIG. 7 shows a schematic of a mobile communication device comprising a particle detector.

FIG. 7 shows a principal sketch of a mobile communication device 190 comprising at least a part of the particle detector 200 discussed with respect to FIG. 9. The particle detector 200 is adapted to emit a laser beam 112. The mobile communication device 190 comprises a user interface 191, a main processing device 192 and a main memory device 193. The main processing device 192 is connected with the main memory device 193 and with the particle detector 200. The main processing device 192 comprises at least a part of the functionalities of controller 150 which are described above. The main processing device 192 stores data related to particle detection in the main memory device 193. In an alternative embodiment it may also be possible that the main processing device 192 and the main memory device 193 are only used to prepare or adapt data provided by the particle detector 200 which may in this case be identical to the particle detector 200 discussed with respect to FIG. 6 such that the data can be presented to a user of the mobile communication device 190 by user interface 191. The particle detector 200 may be powered by a power supply of the mobile communication device 190. The mobile communication device 190 may alternatively comprise a laser sensor module 100 described above. Nearly all data processing and control may in this case be performed by main processing device 192 and main memory device 193. The laser sensor module 100 may alternatively or in addition comprise, for example, an analog filter for suppressing a certain kind of disturbing self mixing interference signals. The same principle may be used in other devices comprising the particle detector 200 or laser sensor module 100.

Figure 8:
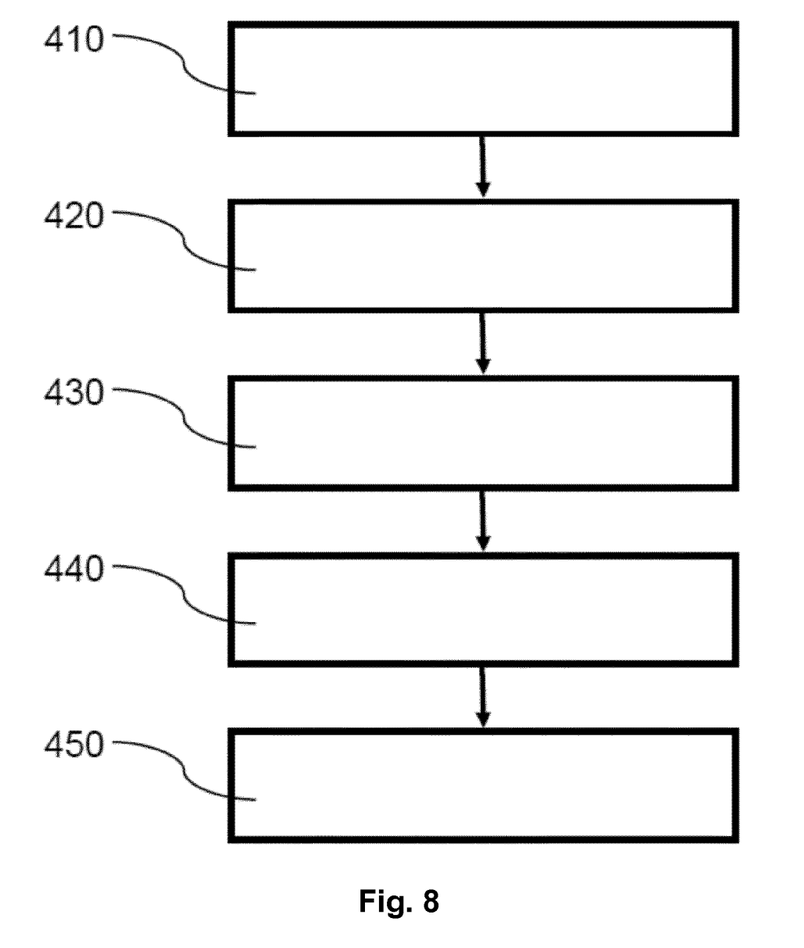
FIG. 8 shows a schematic of a method of particle detection.

FIG. 8 shows an embodiment of a method of particle density detection. A laser beam is emitted in step 410. In step 420 the laser beam is dynamically redirected. The laser beam is imaged in step 430 to a focus region. Determination of self mixing interference signal caused by particles crossing the focus region is allowed in step 440. In step 450 determination of false or disturbing self mixing interference signal for particle detection caused by disturbances in the optical path of the laser beam is suppressed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 particle
51 time (μs)
52 amplitude (arbitrary units)
53 time (ms)
54 frequency (Hz)
55 period of mirror oscillation
57 disturbing frequency signal
65 disturbing self mixing interference signal
100 laser sensor module
111 laser
112 laser beam
113 laser light reflected by optical imaging device
121 detector
125 measurement signal
130 electrical driver
135 interface
150 controller
160 mirror
162 rotation axis
171 optical imaging device
172 reflector
173 lens
190 mobile communication device
191 user interface
192 main processing device
193 main memory device
200 particle detector
410 step of emitting laser beam
420 step of dynamically redirecting laser beam
430 step of imaging laser beam
440 allowing determination of self mixing interference signal caused by particle
450 suppressing determination of self mixing interference signal caused by disturbance

What is claimed is:

1. A method of measuring a particle density of particles, the method comprising:
    emitting, by a laser, a laser beam directed to a mirror,
    redirecting the laser beam by the mirror with a predetermined periodic movement,
    focusing the laser beam to a detection volume by an optical imaging device,
    determining a self mixing interference signal of an optical wave within a laser cavity of the laser if the self mixing interference signal is generated by laser light of the laser beam reflected by at least one of the particles,
    suppressing a false self mixing interference signal for particle detection if the self mixing interference signal is caused by a disturbance in an optical path of the laser beam,
    wherein the false self mixing signal caused by the disturbance in the optical path of the laser beam is suppressed in a defined range of angles of the mirror during the periodic movement.

2. The method according to claim 1, wherein the suppression of the false self mixing interference signal is based on the periodic movement of the mirror.

3. The method according to claim 1, further comprising:
    suppressing the false self mixing signal caused by the disturbance in the optical path based on a first frequency range of the self mixing interference signal generated by laser light of the laser beam reflected by at least one of the particles.

4. The method according to claim 1, further comprising:
    determining the defined range of angles based on a characteristic of the self mixing interference signal determined during the periodic movement of the mirror.

5. The method according to claim 4, wherein the characteristic of the self mixing interference signal is given by a frequency characteristic.

6. The method according to claim 5, wherein the frequency characteristic of the self mixing interference signal over time is a high-frequency and low-amplitude signal at a beginning of the self mixing interference signal, followed by a lower-frequency and higher amplitude of the self mixing interference signal and a low amplitude signal at the end of the self mixing interference signal, wherein the defined range of angles is determined by the beginning and the end of the self mixing interference signal.

7. The method according to claim 1, further comprising:
    suppressing the false self mixing signal caused by the disturbance in the optical path if the self mixing interference signal exceeds a defined threshold duration.

8. The method according to claim 1, further comprising:
    suppressing the false self mixing signal caused by the disturbance in the optical path based on a signal strength of the self mixing interference signal generated by laser light of the laser beam reflected by particles.

9. The method according to claim 1, further comprising:
    suppressing the false self mixing signal caused by the disturbance in the optical path by determining a background noise for a discrete number of time segments within one period of the periodic movement of the mirror and adapting a detection threshold based on the background noise of the respective time segment for the respective time segment.

10. The method according to claim 9, wherein the detection threshold for the respective time period comprises a respective frequency range.

11. The method according to claim 1, wherein the disturbance in the optical path is caused by reflection of a part of the laser light at an element of the optical imaging device, the method further comprising:

suppressing the false self mixing interference signal in a subperiod of the periodic movement of the mirror, wherein the subperiod is characterized by the part of the laser light reflected at the element of the optical imaging device being reflected back in the laser cavity of the laser.

12. A non-transitory computer program product comprising computer executable instructions configured to be saved on at least one memory device, wherein the computer executable instructions, when executed by a processor device of a laser sensor module, the processor device including one or more processors, cause the laser sensor module to execute the method recited by claim 1.

13. The computer program product according to claim 12, wherein the at least one memory device is located in the laser sensor module.

14. The method according to claim 1, wherein the particles have a size of less than 20 μm.

15. The method according to claim 14, wherein the particles have a size of less than 10 μm.

16. A laser sensor module for measuring a particle density of particles in a fluid, the laser sensor module comprising:

a laser arranged to emit a laser beam directed to a mirror, wherein the mirror is arranged to move periodically to redirect the laser beam, an optical imaging device arranged to focus the laser beam to a detection volume, wherein the laser sensor module is arranged to determine a self mixing interference signal of an optical wave within a laser cavity of the laser if the self mixing interference signal is generated by laser light of the laser beam reflected by at least one of the particles, wherein the laser sensor module is further arranged to suppress a false self mixing interference signal for particle detection if the self mixing interference signal is caused by a disturbance in an optical path of the laser beam, wherein the false self mixing signal caused by the disturbance in the optical path is suppressed in a defined range of angles of the mirror during the periodic movement.

17. A device comprising the laser sensor module according to claim 16.

* * * * *